(12) United States Patent
Matsushima

(10) Patent No.: US 7,916,608 B2
(45) Date of Patent: Mar. 29, 2011

(54) RECORDING APPARATUS

(75) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 12/143,149

(22) Filed: Jun. 20, 2008

(65) Prior Publication Data

US 2008/0316889 A1    Dec. 25, 2008

(30) Foreign Application Priority Data

Jun. 22, 2007   (JP) ................. 2007-165649

(51) Int. Cl.
*G11B 7/28* (2006.01)
(52) U.S. Cl. ........................................ 369/84
(58) Field of Classification Search ......... None
See application file for complete search history.

(56) References Cited

U.S. PATENT DOCUMENTS

2004/0013060 A1 * 1/2004 Ito ............................. 369/47.12

FOREIGN PATENT DOCUMENTS

JP   2003-257021 A   9/2003

* cited by examiner

*Primary Examiner* — Thang V Tran
*Assistant Examiner* — Brian Butcher
(74) *Attorney, Agent, or Firm* — Canon USA Inc IP Division

(57) ABSTRACT

A recording apparatus includes a recording/reproducing unit to record/reproduce information data on/from each of a plurality of first recording media; an outputting unit to output the information data reproduced from the first recording media to a recording device in order to record the information data recorded on the first recording media on a second recording medium by the recording device; an obtaining unit to obtain sizes of respective pieces of the information data recorded on the first recording media; a generating unit to generate association information including identification information to identify the first recording media associated with each other and order information indicating order of the first recording media; and a determination unit configured to determine addresses used to record the respective pieces of the information data recorded on the first recording media on the second recording medium based on the association information and the obtained data sizes.

7 Claims, 9 Drawing Sheets

FIG. 3A

| DISC ID | ASSOCIATION NUMBER | DISC TITLE | ORDER NUMBER | HEAD OFFSET | |
|---|---|---|---|---|---|
| 021 | 5 | ATHLETIC FESTIVAL IN 2006 | 1 | OFFSET5 - 1 | ⎫ |
| 022 | 5 | ATHLETIC FESTIVAL IN 2006 | 2 | OFFSET5 - 2 | |
| 023 | 5 | ATHLETIC FESTIVAL IN 2006 | 3 | OFFSET5 - 3 | |
| 024 | 6 | SCHOOL PLAY IN 2006 | 1 | OFFSET6 - 1 | |
| 025 | 6 | SCHOOL PLAY IN 2006 | 2 | OFFSET6 - 2 | HISTORY |
| 026 | 7 | TRIP TO AMERICA | 1 | OFFSET7 - 1 | |
| ... | ... | ... | ... | ... | |
| 035 | 11 | CONCERT | 2 | OFFSET11 - 2 | ⎭ |
|  |  |  |  |  | ⎫ |
|  |  |  |  |  | FREE AREA |
|  |  |  |  |  | |
|  |  |  |  |  | ⎭ |

FIG. 3B

| 036 | 12 | SUMMER TRIP | 1 | OFFSET12 - 1 |
|---|---|---|---|---|

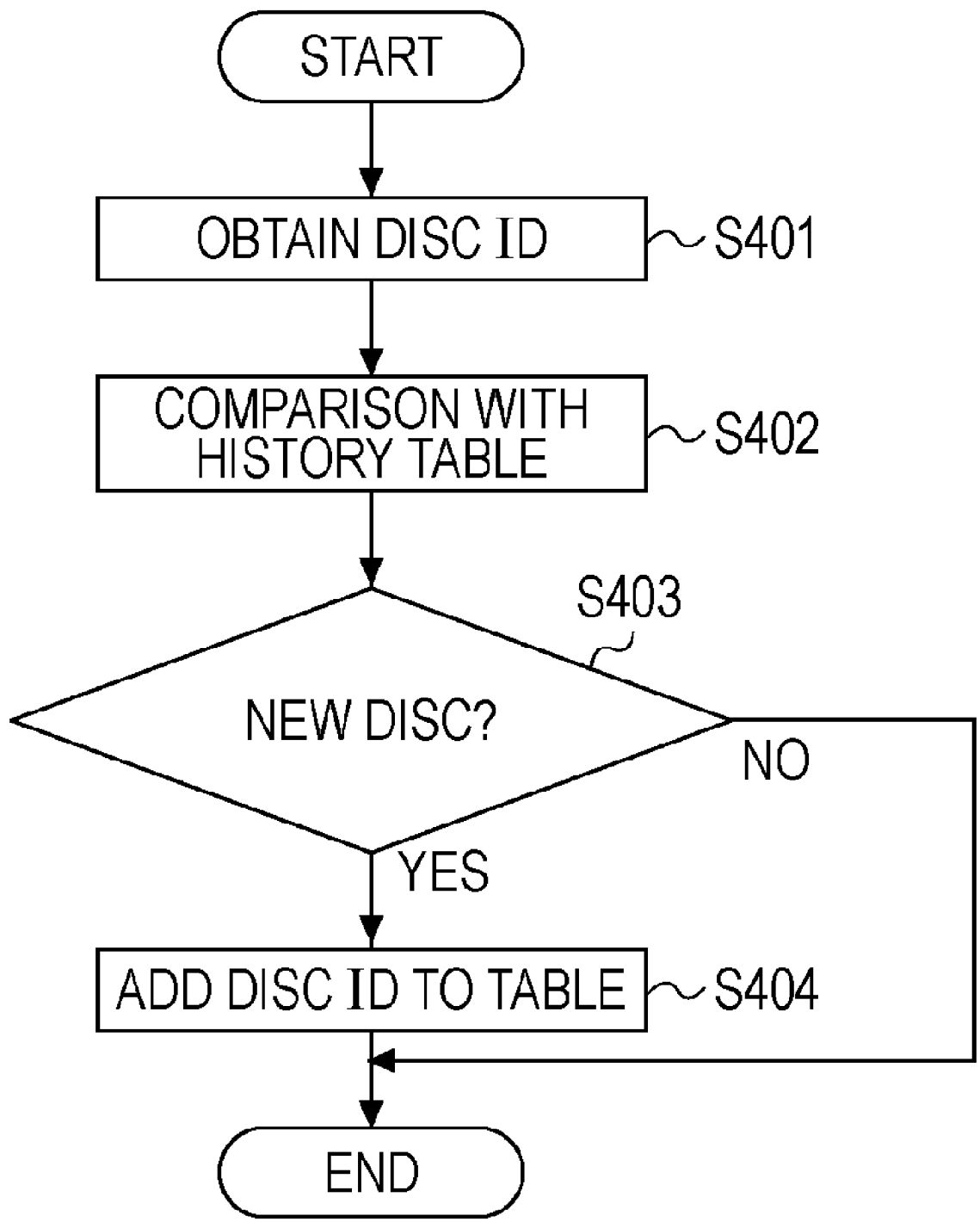

FIG. 9
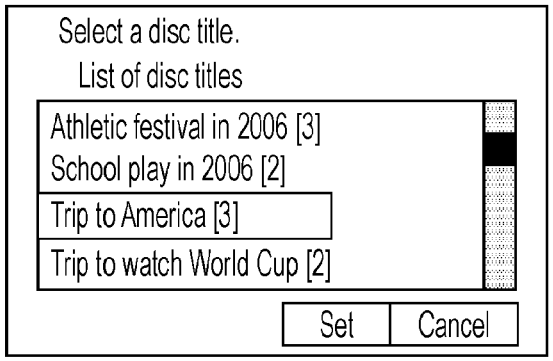
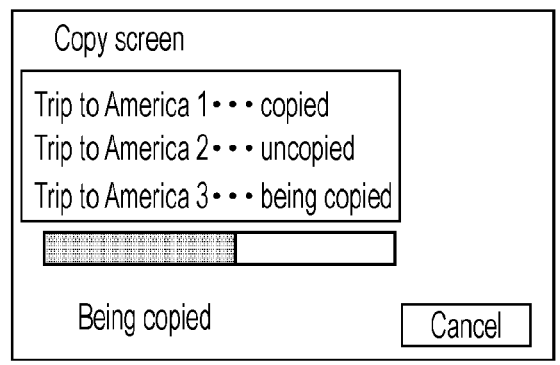
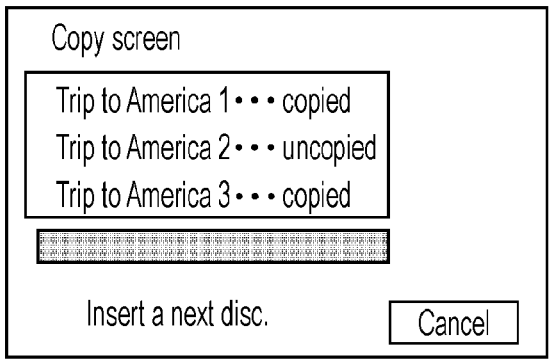
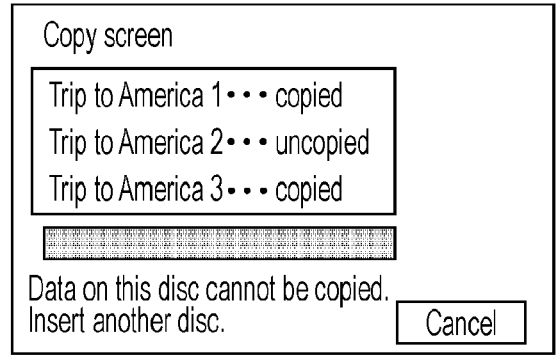
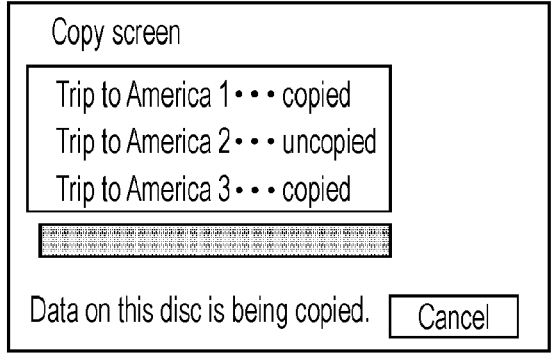

FIG. 10
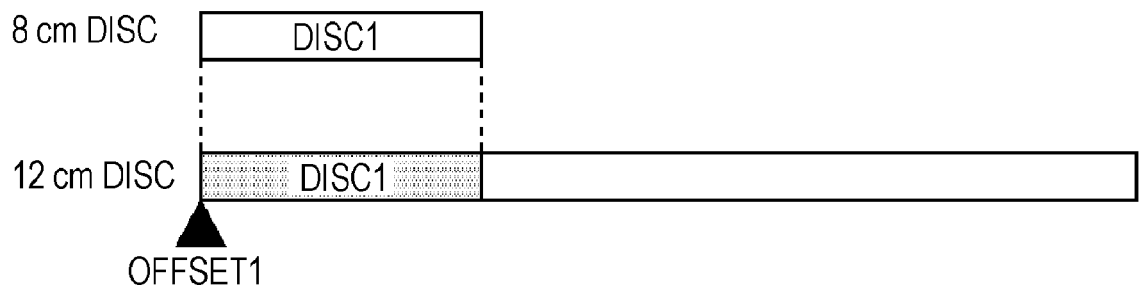
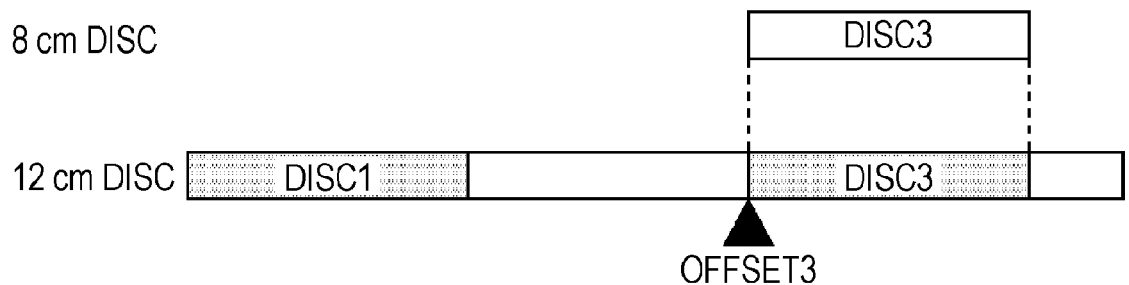
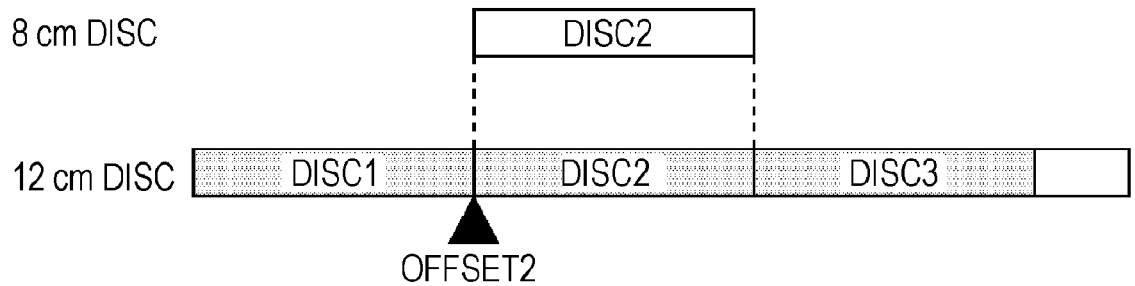

RECORDING APPARATUS

BACKGROUND OF THE INVENTION

1. Field of the Invention

The present invention relates to a recording apparatus and a recording method, particularly to a technique used for a recording apparatus capable of recording data on a removable medium, such as an optical disc or a semiconductor memory card.

2. Description of the Related Art

In recent years, recording apparatuses capable of recording data on a large-capacity removable medium, such as an optical disc or a memory card, have become mainstream, and media of various types of storage capacity have been used. For example, one-side recording DVDs (digital versatile discs) include a disc having recording capacity of about 1.4 GB and a diameter of 8 cm; and a disc having recording capacity of about 4.7 GB and a diameter of 12 cm.

Typically, in a portable apparatus, such as a video camera to record image signals on a DVD, importance is placed on portability and thus a disc of a smaller diameter, that is, an 8 cm disc, is used therein (e.g., see Japanese Patent Laid-Open No. 2003-257021). On the other hand, a 12 cm disc is optimum as a medium to eventually store image data for reasons of large storage capacity and a low unit price.

Under these circumstances, a configuration of eventually storing data by copying the data recorded on a plurality of rewritable 8 cm discs to a 12 cm disc can be suggested. In this way, by copying data to the 12 cm disc and then erasing the data on the 8 cm discs, the 8 cm discs can be used again for shooting.

As described above, the 8 cm disc is compact but the storage capacity thereof is smaller than that of the 12 cm disc. Thus, if image data is recorded in a high image quality mode of high bit rate, data of only a very short time (e.g., about 20 minutes) can be recorded on the 8 cm disc. Thus, when shooting is performed by using the 8 cm disc during a trip or an event, a plurality of discs are required to record images in many cases.

For example, when a backup of data recorded on 8 cm discs is to be made by using a 12 cm disc, data recorded on three 8 cm discs can be recorded on a 12 cm disc.

As a specific backup method, the following method can be used. That is, an 8 cm disc is loaded into a main body of a video camera, data recorded on the 8 cm disc is transferred to an external drive, and then the data is copied onto a 12 cm disc. This series of operations is repeated three times.

When such a backup operation is performed, it is ideal that pieces of data to be recorded on the 12 cm disc as a backup are sorted in the order of having been recorded in the main body of the video camera. For this reason, data transfer needs to be performed in accordance with the order of discs on which data is recorded.

Particularly, when data is to be recorded in a DVD video mode so that the data can be reproduced by a typical DVD player, a reproducing order cannot be changed after recording, and thus the data needs to be written in a desired reproducing order during backup.

In the above-described method, when images of an event are recorded on a plurality of 8 cm discs, a cumbersome task is imposed on a user to determine the order of the discs.

For example, the user needs to take a note on labels of the discs or check the content of all the discs to determine a backup order before making a backup of the data.

SUMMARY OF THE INVENTION

The present invention has been made in view of the above-described problems and is directed to eliminating the need to determine the order of transferring data stored on a plurality of storage media when the data is transferred to a storage medium.

Further features of the present invention will become apparent from the following description of exemplary embodiments with reference to the attached drawings.

BRIEF DESCRIPTION OF THE DRAWINGS

FIGS. 3A and 3B illustrate an example of a list to record disc association information.

FIG. 4 is a flowchart illustrating an example of a table adding process performed after a disc has been inserted.

FIG. 9 illustrates an example of message display screens displayed during a backup making process.

FIG. 10 illustrates an example of data positioning in a backup.

DESCRIPTION OF THE EMBODIMENTS

First Embodiment

Figure 1:
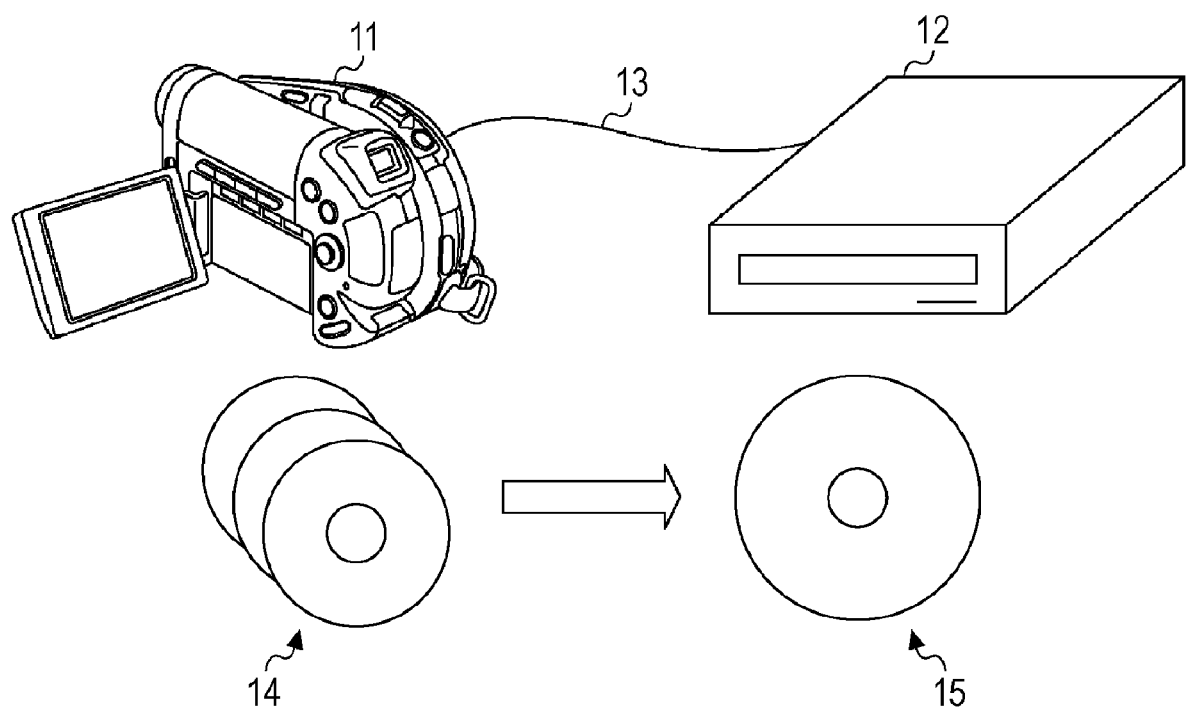
FIG. 1 illustrates a configuration of a copying system according to an embodiment of the present invention.

FIG. 1 illustrates an example of a configuration of a copying system according to a first embodiment, in which a video camera (recording apparatus) 11 and an external drive (DVD drive) 12 connect to each other via a connection cable 13. In this embodiment, a communication terminal (not illustrated) provided in the video camera 11 connects to a communication terminal (not illustrated) provided in the external drive 12 via the connection cable 13. In this embodiment, a case of copying data recorded on three 8 cm discs 14 to a 12 cm disc 15 is described.

Figure 2:
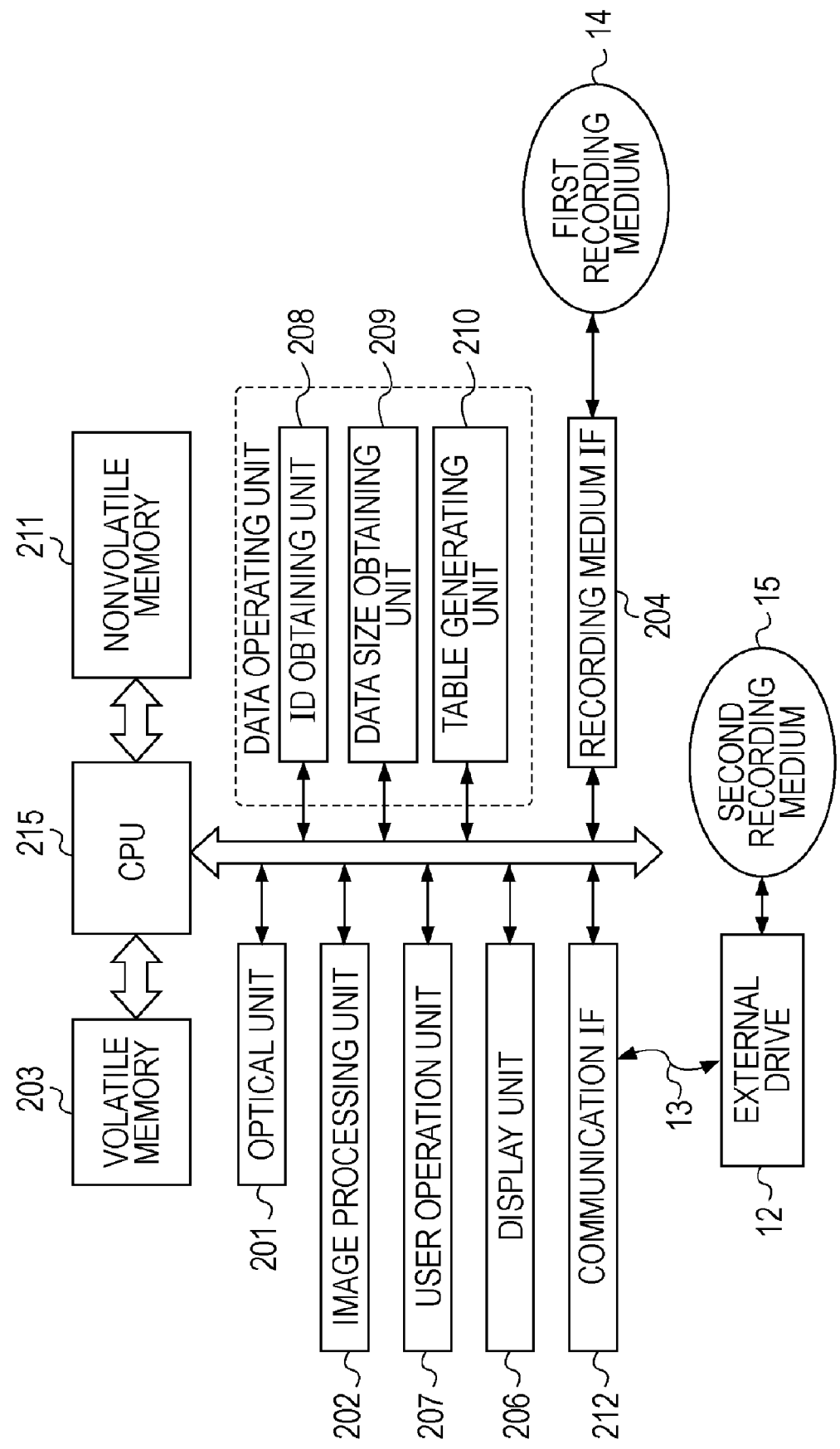
FIG. 2 is a block diagram illustrating a schematic configuration of a video camera according to the embodiment.

FIG. 2 schematically illustrates a system to realize the copying system according to this embodiment.

In FIG. 2, outside light passed through an optical unit 201 (including an optical system, a motor to control the optical system, and an image pickup device) forms an optical image on a surface of the image pickup device, which converts the optical image to an electric signal.

Then, the electric signal generated from the optical image is converted to a digital data by an image processing unit 202, where a known compressing and encoding process is performed on the digital data, and then the digital data is stored in a volatile memory 203. The digital data stored in the volatile memory 203 is recorded on a first recording medium (disc) 14 loaded into the video camera 11 via a recording medium interface 204.

When image data recorded on the disc 14 is reproduced, the digital data read from the disc 14 is decompressed by the image processing unit 202 and is converted to a signal optimal for display, so that images are displayed on a display unit 206.

A user provides instructions about a recording/reproducing operation or a copying operation (described below) of the video camera 11 by operating various switches or operation buttons provided in a user operation unit 207. An ID obtaining unit 208 obtains identification information (ID or serial number) unique to the medium recorded on the disc 14. A data size obtaining unit 209 obtains a data size of moving image data recorded on the disc 14.

A table generating unit 210 generates a table, including association information of each medium ID obtained in the ID obtaining unit 208, data sizes obtained in the data size obtaining unit 209, and head addresses calculated and determined. The generated table is stored in a nonvolatile memory 211. A method for calculating the head addresses is described below.

The video camera 11 according to this embodiment includes a communication interface 212, which connects to the external drive 12 via the connection cable 13 so as to perform data communication. Accordingly, data recorded on the disc 14 can be read and output to the external drive 12, and the data can be recorded on a second recording medium (disc) 15.

Typically, communication between the external drive 12 and the communication IF 212 is performed via a USB (universal serial bus). The above-described system is controlled by a CPU (central processing unit) 215. In this embodiment, the storage capacity of the disc 14 is smaller than that of the disc 15. For example, an 8 cm DVD is used as the disc 14 and a 12 cm DVD is used as the disc 15.

Now, a disc association information table is described. In this embodiment, the disc association information table illustrated in FIGS. 3A and 3B is generated by the CPU 215 and is stored in the nonvolatile memory 211.

FIG. 3A illustrates an example of the disc association information table. This table describes disc IDs, association numbers (association information) indicating association of a series of recorded data, and disc titles corresponding to the association numbers. Also, the table describes order numbers indicating the order in the same association numbers and data head offset in a backup disc.

As described below, the same association number is given to discs 14 having the same disc title given by a user, and those discs are managed as belonging to the same group.

The disc ID is a unique serial number. Typically, the disc ID is a random number of a plurality of digits. However, in this embodiment, three-digit sequential numbers are used for simple description. Those pieces of information are generated by the CPU 215 when the disc 14 is loaded into the video camera 11 and are added to the information table. This list is stored in the nonvolatile memory 211 of the video camera 11.

FIG. 4 is a flowchart illustrating a process performed after the disc 14 has been newly loaded.

After the disc has been loaded, initialization of recording or reproducing is performed and the disc ID of the loaded disc is obtained by the ID obtaining unit 208 in step S401.

Then, in step S402, the disc ID obtained in step S401 is compared with the history table. Then, in step S403, it is determined whether the newly loaded disc has been used before.

As a result of the determination in step S403, if the disc has been used before, the disc ID of the disc loaded this time is stored as a disc ID to be updated in the disc association table in FIG. 3.

On the other hand, if the disc has not been used before (unused disc), the process proceeds to step S404, where the disc ID is added in a free area of the table as a new disc.

Figure 5A:
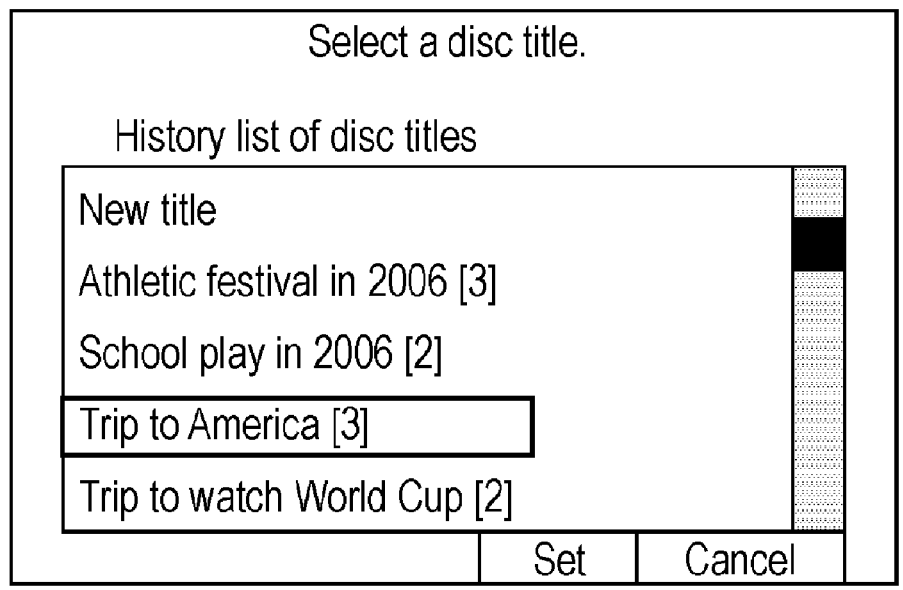
FIGS. 5A and 5B illustrate an example of display screens encouraging a user to input a disc title.

Also, when a new disc is loaded, a message encouraging a user to input a disc title is displayed on the display unit 206, as illustrated in FIG. 5A. In this embodiment, if the data to be recorded on this disc is continued from the previously recorded data, a history list of titles that have been previously input is displayed. By allowing the user to select a title from the list, a title input operation can be simplified.

If any of the disc titles in the history list is selected, the association number of the disc is the same as that of the selected disc title.

Then, the order number is incremented by 1 from that of the disc on which this disc title was recorded last. In the example illustrated in FIG. 5A, "New title", "Athletic festival [3]", "School play [2]", "Trip to America [3]", and "Trip to watch World Cup [2]" are displayed.

Here, if the title selected for the new disc has already been assigned to three discs, a new association number is given to the fourth disc.

In this embodiment, a configuration of copying data recoded on a plurality of 8 cm discs by the video camera 11 to a 12 cm disc is assumed. The data on three 8 cm discs can be recorded on a 12 cm disc.

Therefore, in this embodiment, a new association number is given every time the same disc title is given to the three discs 14. At this time, the order information returns to 1 every time the same disc title is given to three discs. In other words, the order information indicates the order in the three discs having the same association number. Also, the head offset information indicates the offset in the three discs having the same association number.

Figure 5B:
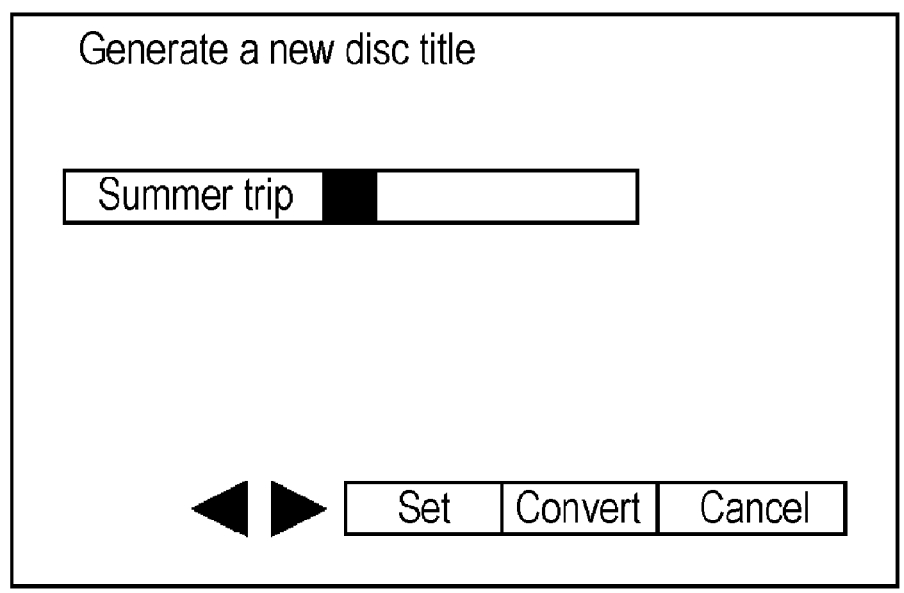

On the other hand, if the user wants to give a new title, not a previously used title, the user selects "New title" from among the items displayed in FIG. 5A. Then, a disc title input screen illustrated in FIG. 5B is displayed.

Then, the user inputs a title, e.g., "Summer trip", an association number "12" is newly generated, an order number "1" is given, and then those pieces of information are added in the free area as illustrated in FIG. 3B. If the user presses a cancel button without inputting a title, the disc is not managed in the list. Note that a title can be given later as necessary. A sufficient amount of history needs to be stored in the list. However, if the entire area of the list is occupied, data is overwritten from the oldest one.

Hereinafter, update of the head offset information in the disc association information table is described in detail.

Figure 6:
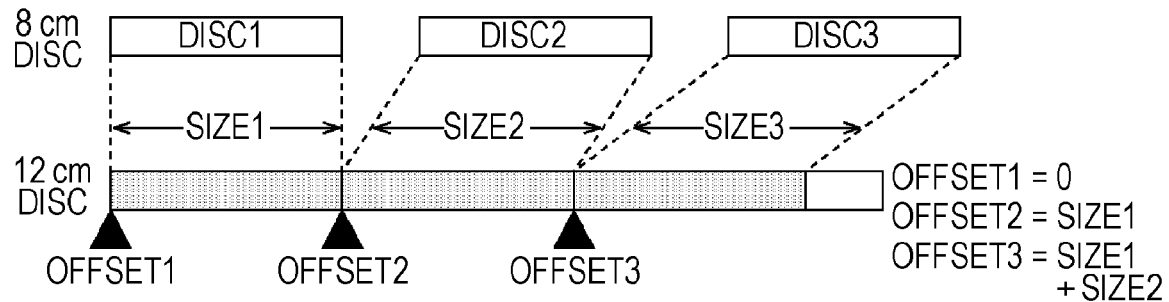
FIG. 6 illustrates data positioning in a backup.

FIG. 6 illustrates a state of recording the data on the three 8 cm discs 14 on the 12 cm disc 15.

When the data recorded on the three 8 cm discs 14 is recorded on the 12 cm disc 15 as a copy destination in accordance with the recording order, the addresses of head positions of the respective 8 cm discs 14 in the disc 15 are offset 1, offset 2, and offset 3, respectively.

These values can be calculated based on the respective sizes of data recorded on the 8 cm discs 14 having the same association number.

That is, offset 1 is 0, offset 2 is size 1, which is the size of the data recorded on the first 8 cm disc 14, and offset 3 is size 1+size 2, which is a total size of the data recorded on the first and second 8 cm discs 14. In this embodiment, the size of data recorded on the present disc 14 is calculated every time recording of moving image data on the disc 14 by the recording medium IF 204 ends. Then, an offset value is calculated based on the calculated data size, and the offset value corresponding to the disc ID of the disc that is currently loaded is updated in the table illustrated in FIG. 3A.

Figure 7:
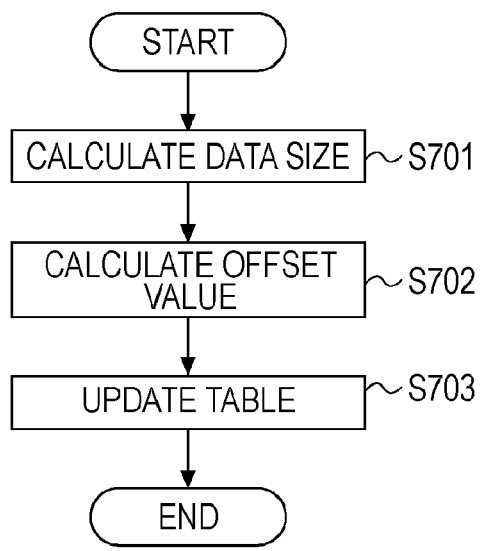
FIG. 7 is a flowchart illustrating an example of a table information updating process performed at the end of recording.

FIG. 7 is a flowchart illustrating a process at end of recording.

After recording ends, the size of data recorded on the disc 14 is calculated in step S701. Then, in step S702, an offset value is calculated in the above-described calculation method based on the offset value of another disc having the same disc association number as that of the present disc 14 described in the disc association information table and the data size calculated in step S701. Then, in step S703, the table is updated by regarding the value calculated in step S702 as an offset value of the table.

Next, a data backup process is described.

Figure 8:
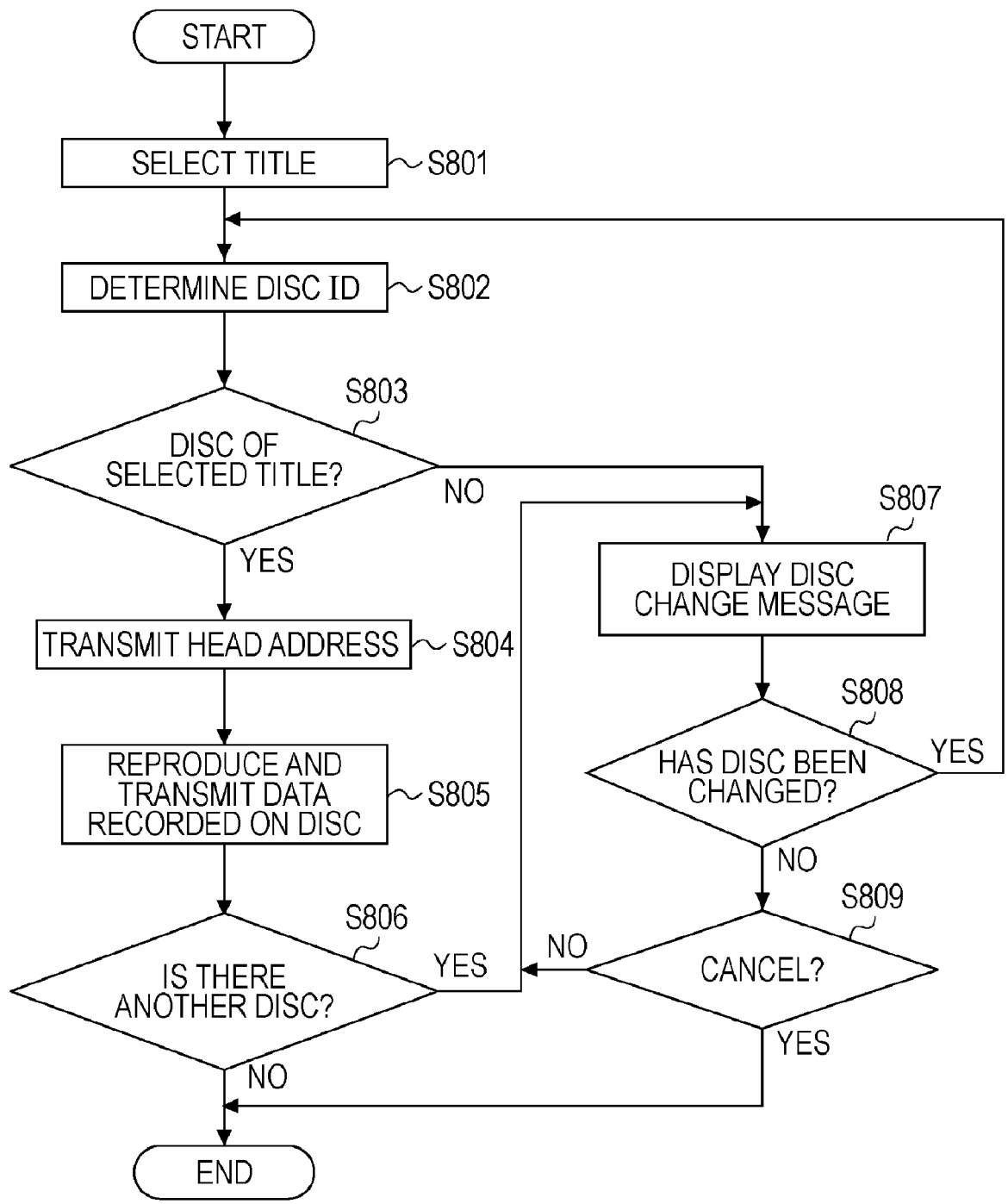
FIG. 8 is a flowchart illustrating an example of a process performed to make a backup.

FIG. 8 is a flowchart illustrating a data backup process.

First, a user operates the operation unit 207 in order to set a copy mode under a state where the recording apparatus 11 connects to the external drive 12 via the connection cable 13, and then the process illustrated in FIG. 8 starts. In this case, a blank disc on which no data is recorded is loaded as the disc 15 as a copy destination.

First, in step S801, the user is allowed to select a title of the disc of which data is to be copied based on the disc association information table. Referring to FIG. 9, a screen 901 is an example of a title selecting screen displayed in the display unit 206 at this time. As shown in the screen 901, the disc titles described in the disc association information table are displayed.

In the screen 901, the number inside parentheses after each disc title indicates the number of discs 14 to which that title is given. In this embodiment, information indicating whether the data recorded on each disc 14 described in the disc association table has been backed up is stored in the nonvolatile memory 211. Also, as illustrated in FIG. 9, information indicating whether the data recorded on each disc 14 has been copied is displayed.

After the user selects a title, the process proceeds to step S802, where the disc ID of the disc 14 loaded now is determined in accordance with the title selected in step S801. Then, the process proceeds to step S803, where it is determined whether the disc 14 loaded now is one of the series of discs to which the title selected in step S801 is given. In step S803, if the data recorded on one or more discs 14 has already been backed up to the disc 15, it is also determined whether the same disc association number as that given to the disc 14 of which data has been backed up is given, as described below.

As a result of the determination in step S803, if the loaded disc is the disc of the selected title, the process proceeds to step S804, where the head offset corresponding to the disc ID of this disc 14 is obtained from the disc association table. Then, information of the head offset is transmitted, as head address information of recording, to the external drive 12.

Then, the process proceeds to step S805, where the data recorded on the disc 14 is reproduced by the recording medium IF 204. Then, the reproduced data is transmitted to the external drive 12 via the communication IF 212, together with a command to start recording. The external drive 12 records the data transmitted from the communication IF 212 on the disc 15 starting from the address specified by the head address information that has been received. During transmission, a message indicating that copy is being performed is displayed, and also progress of data transfer and writing is indicated by a progress bar, as shown in a screen 902 in FIG. 9.

After the transmission ends, the process proceeds to step S806, where it is determined whether there is a disc on which a backup process has not been performed other than the present disc 14 among all the discs having the title selected in step S801. As a result of the determination, if there is a disc on which a backup process has not been performed, the process proceeds to step S807, where a disc change message is displayed. An example of the disc change message is shown in a screen 903 in FIG. 9.

The screen 903 shows that there are three discs having a title "Trip to America", that a backup process has been performed on two of the three discs, and that a backup process has not been performed on the other disc.

In this way, in step S807, the screen displays information about discs on which a backup process has been performed and has not been performed among the discs having the selected title.

After the disc change message is displayed in step S807, the process proceeds to step S808, where it is determined whether the disc has been changed. If the disc has been changed, the process returns to step S802.

If the disc has not been changed and if a cancel operation is performed in step S809, the process ends.

As a result of the determination in step S803, it may be determined that the loaded disc 14 is not a disc having the title selected in step S802 or is not a disc described in the association table.

In that case, a disc change message shown in a screen 904 is displayed to encourage the user to insert another disc. Also, if a disc of which data has been backed up is loaded, a message shown in a screen 905 is displayed to encourage the user to insert another disc.

Hereinafter, a data transfer image to copy the data recorded on three 8 cm discs to a 12 cm disc is described.

In this embodiment, the external drive 12 writes the data transferred thereto on the 12 cm disc starting from the offset addresses based on the offset information, as described above. Hereinafter, a case of the following data transfer order: the first disc, the third disc, and the second disc, is described as an example.

As shown in a stage 1001 in FIG. 10, when the data on the first disc 14 is recorded, the data is recorded from the head of the 12 cm disc 15 as a copy destination because the value of offset 1 is 0. Then, as shown in a stage 1002 in FIG. 10, when the data on the third disc 14 is recorded, the data is written from the address of offset 3 on the disc 15. Finally, as shown in a stage 1003 in FIG. 10, when the data on the second disc 14 is recorded, the data is written from the address of offset 2, which is an unrecorded area. After all the data has been written, the 12 cm disc 15 contains the data on the three 8 cm discs 14, the data being arranged in the recording order.

The case of copying the data on the three 8 cm discs to the 12 cm disc has been described above. Under present circumstances, large capacity media including Blu-ray Disc (BD) have been put to practical use. Thus, data on a plurality of 8 cm discs can be copied to such a large capacity medium, instead of the 12 cm DVD.

In that case, too, a backup process can be realized in the same manner by applying the present invention.

The capacity of BD is 27 GB, and thus data on twenty-two 8 cm DVDs can be recorded on a BD. Therefore, when the BD is used as a backup disc, a disc association number illustrated in FIG. 3A can be assigned to twenty-two 8 cm discs.

In the above-described embodiment, an example of directly writing data recorded on a plurality of 8 cm discs on a 12 cm disc has been described. Alternatively, the data recorded on the plurality of 8 cm discs may be recorded in a large capacity recording device, such as a hard disk, and then the data may be written on the 12 cm disc from the hard disk.

Other Embodiments of the Present Invention

The respective units constituting the recording apparatus according to the above-described embodiment of the present invention can be realized when a program stored in a RAM or a ROM of a computer operates. This program and a computer-readable recording medium containing the program are included in the present invention.

Also, the present invention can be embodied as a system, apparatus, method, program, or storage medium. Specifically, the present invention can be applied to a system including a plurality of apparatuses or a single apparatus.

The present invention can also be achieved in the following manner. That is, a software program executing the respective steps in the above-described recording method (in the above-described embodiment, the program corresponding to the flowcharts illustrated in FIGS. 4, 7, and 8) is supplied to a system or an apparatus directly or from a remote site. Then, a computer of the system or the apparatus reads and executes the supplied program code.

Therefore, the program code installed into the computer in order to realize functional processes of the present invention by a computer also realizes the present invention. In other words, the computer program to realize the functional processes of the present invention is included in the present invention.

In that case, the computer program may be in any form as long as it has a function of the program, for example, object code, a program executed by an interpreter, or script data supplied to an OS (operating system) may be used.

Various types of recording media can be used as a recording medium to supply the program. For example, a floppy® disk, a hard disk, an optical disc, an MO (magneto-optical) disc, a CD-ROM (compact disc read only memory), a CD-R (compact disc recordable), a CD-RW (compact disc rewritable), a magnetic tape, a nonvolatile memory card, a ROM (read only memory), and a DVD (DVD-ROM or DVD-R) can be used.

Alternatively, the program may be supplied by accessing a web site on the Internet by using a browser of a client computer and then downloading the computer program of the present invention or a compressed file having an automatic install function from the web site to a recording medium, such as a hard disk.

Also, program code constituting the program of the present invention may be divided into a plurality of files and the respective files may be downloaded from different web sites. That is, a WWW (World Wide Web) server allowing a plurality of users to download the program files to realize the functional processes of the present invention by a computer is included in the present invention.

Alternatively, the program of the present invention may be encrypted, stored in storage media such as CD-ROMs, and distributed to users. Then, users satisfying a predetermined condition may be allowed to download key information to decrypt the encrypted program from a web site over the Internet. Accordingly, the users can execute the encrypted program by using the key information and install the program into the computer.

Also, the function of the above-described embodiment can be realized when the computer reads and executes the program, and also the function of the above-described embodiment can be realized when an OS or the like operating in the computer performs part or all of actual processes.

Furthermore, the function of the above-described embodiment may be realized in the following manner. That is, the program read from a recording medium is written in a memory included in a function expansion board inserted into the computer or a function expansion unit connected to the computer. Then, a CPU or the like included in the function expansion board or the function expansion unit executes part or all of actual processes based on instructions of the program.

Furthermore, the function of the above-described embodiment may be realized in the following manner. That is, the program read from a storage medium is written in a memory included in a function expansion board inserted into the computer or a function expansion unit connected to the computer. Then, a CPU or the like included in the function expansion board or the function expansion unit executes part or all of actual processes based on instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-165649 filed Jun. 22, 2007, which is hereby incorporated by reference herein in its entirety.

What is claimed is:

1. A recording apparatus comprising:
   a recording and reproducing unit configured to record information data on each of a plurality of first recording media, and configured to reproduce the information data from the each of the plurality of first recording media;
   an outputting unit configured to output the information data reproduced from the first recording media to a recording device in order to record the information data recorded on the first recording media on a second recording medium by the recording device;
   an obtaining unit configured to obtain sizes of respective pieces of the information data recorded on the first recording media;
   a generating unit configured to generate association information including identification information to identify which of the plurality of first recording media are associated with each other and an order information indicating order of the plurality of first recording media associated with each other; and
   a determination unit configured to determine addresses used to record the respective pieces of the information data recorded on the plurality of first recording media associated with each other on the second recording medium based on the association information and the obtained data sizes.

2. The recording apparatus according to claim 1, wherein storage capacity of each of the first recording media is smaller than that of the second recording medium.

3. The recording apparatus according to claim 1, further comprising:
   a memory configured to store the association information and the addresses determined by the determination unit.

4. The recording apparatus according to claim 1, further comprising:
   a title adding unit configured to add a title to each of the first recording media; and
   a storage unit configured to store information of the title added to the plurality of first recording media and the association information, wherein the information of the title is associated with the association information.

5. The recording apparatus according to claim 4, wherein the generating unit generates the association information based on the title added to the first recording media by the title adding unit.

6. The recording apparatus according to claim 1, wherein the generating unit generates the order information indicating the order of a predetermined number of the first recording media determined based on storage capacity of each of the first recording media and storage capacity of the second recording medium.

7. The recording apparatus according to claim 1, further comprising:
a storage unit configured to store address information about the addresses determined by the determination unit, wherein the address information is associated with the identification information of the plurality of first storage media, wherein the outputting unit outputs the address information corresponding to the identification information of each of the first recording media and information data reproduced from the first recording media to the recording device.

* * * * *